(12) United States Patent
Yumoto et al.

(10) Patent No.: US 9,323,388 B2
(45) Date of Patent: Apr. 26, 2016

(54) TOUCH PANEL SYSTEM, AND ELECTRONIC INFORMATION DEVICE

(71) Applicant: SHARP KABUSHIKI KAISHA, Osaka (JP)

(72) Inventors: Manabu Yumoto, Osaka (JP); Shunsuke Nagasawa, Osaka (JP); Qian Yan, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

(21) Appl. No.: 14/414,445

(22) PCT Filed: Jul. 9, 2013

(86) PCT No.: PCT/JP2013/068758
§ 371 (c)(1),
(2) Date: May 13, 2015

(87) PCT Pub. No.: WO2014/010594
PCT Pub. Date: Jan. 16, 2014

(65) Prior Publication Data
US 2015/0242048 A1    Aug. 27, 2015

(30) Foreign Application Priority Data

Jul. 11, 2012    (JP) .................................. 2012-155814

(51) Int. Cl.
G06F 3/041    (2006.01)
G06F 3/044    (2006.01)
G06F 3/0488    (2013.01)

(52) U.S. Cl.
CPC .............. *G06F 3/0418* (2013.01); *G06F 3/044* (2013.01); *G06F 3/0412* (2013.01); *G06F 3/0416* (2013.01); *G06F 3/04886* (2013.01)

(58) Field of Classification Search
CPC .......... G06F 3/044; G06F 2203/04103; G06F 3/041; G06F 3/0412; G06F 3/0418; G06F 3/04886; G06F 3/0436; G06F 3/045; G06F 3/04842; G06F 2203/04102; G06F 3/043; G06F 1/16; G06F 1/1601; G06F 2200/1612; G06F 2203/04107; G06F 2203/04111
USPC .......................................... 345/173, 174, 175
See application file for complete search history.

(56) References Cited

U.S. PATENT DOCUMENTS 8,310,456 B2 * 11/2012 Kim et al. ..................... 345/173
2007/0242053 A1   10/2007 Muranaka
(Continued)

FOREIGN PATENT DOCUMENTS

JP    2007-286814 A    11/2007
JP    2008-287575 A    11/2008
(Continued)

OTHER PUBLICATIONS

International Preliminary Examination Report, mailed May 19, 2014, issued in PCT/JP2013/068758.

*Primary Examiner* — Duc Dinh
(74) *Attorney, Agent, or Firm* — Birch, Stewart, Kolasch & Birch, LLP

(57) ABSTRACT

A touch panel system (1) includes: a touch panel (3) for outputting an output signal in accordance with a presence or absence of an indicator that is in contact with or close to a detection surface P; and an indicator position detection unit (5) for detecting a position of the indicator within the detection surface (P) based on the output signal outputted by the touch panel (3). The indicator position detection unit (5) detects the position of the indicator within the detection surface (P) by use of a detection reference that is set for each predetermined position within the detection surface (P).

14 Claims, 8 Drawing Sheets

(56) References Cited

U.S. PATENT DOCUMENTS

2011/0074731 A1    3/2011    Inoue et al.
2012/0075238 A1    3/2012    Minami et al.
2012/0092296 A1*   4/2012    Yanase et al. ................ 345/174

FOREIGN PATENT DOCUMENTS

| | | |
|---|---|---|
| JP | 2011-076484 A | 4/2011 |
| JP | 2012-073783 A | 4/2012 |
| JP | 2012-103995 A | 5/2012 |

* cited by examiner

TOUCH PANEL SYSTEM, AND ELECTRONIC INFORMATION DEVICE

CROSS-REFERENCE TO RELATED APPLICATIONS

This application is a National Phase filing under 35 U.S.C. §371 of International Application No. PCT/JP2013/068758 filed on Jul. 9, 2013, and which claims priority to Japanese Patent Application No. 2012-155814 filed on Jul. 11, 2012.

TECHNICAL FIELD

The present invention relates to a touch panel system and an electronic information device provided with the touch panel system.

BACKGROUND ART

In recent years, a touch panel system, which accepts a user's instruction by detecting a position of an indicator (e.g., a user's finger or a stylus, the same applies hereinafter) that is in contact with or close to a detection surface of a touch panel, has been increasingly installed in a cell phone, a personal computer, a vending machine, and the like. Further, the touch panel system has recently come to be installed in a large-sized display device, a white board and the like, and there has thus been an increase in size of the touch panel.

In such a touch panel system, it is determined whether or not the indicator is in contact with or close to the detection surface based on an output signal outputted by the touch panel, but when some abnormality such as deformation occurs in the touch panel, the output signal varies due to the abnormality, and erroneous detection of the indicator thus occurs.

Therefore, for example, Patent Document 1 proposes a touch panel system in which, when the user presses the indicator to the detection surface of the touch panel more strongly than necessary, contact of the indicator is detected as distinguished from deflection that occurs in the touch panel, thereby suppressing erroneous detection of the indicator.

PRIOR ART DOCUMENTS

Patent Document

Patent Document 1: Japanese Unexamined Patent Application Publication NO. 2011-76484

SUMMARY OF THE INVENTION

Problems to be Solved by the Invention

Incidentally, when the touch panel becomes larger in size as described above, variations in characteristic of the touch panel tend to occur within the detection surface. Specifically, for example, variations in thickness of the touch panel tend to occur within the detection surface. When variations in characteristic of the touch panel occur within the detection surface, a position where the indicator is difficult to detect is locally generated within the detection surface, which is problematic.

A specific example of the above problem will be described with reference to FIGS. 8A to 8C. FIGS. 8A to 8C are views showing a specific example of a problem in a conventional touch panel system. It should be noted that FIG. 8B shows a state later in time than FIG. 8A, and FIG. 8C shows a state later in time than FIG. 8B.

FIGS. 8A to 8C show a problem that occurs in a case where, on a detection surface 210 of a touch panel 200, the user tries to get an image 310 displayed on a display device 300 to move following an indicator 400 by performing an operation (drag) of sliding the indicator 400 on the detection surface while keeping the indicator 400 in contact with the detection surface. It is to be noted that on the detection surface 210 of the touch panel 200 shown in FIGS. 8A to 8C, there is a detection difficult region 211 which is a region where detection of the indicator 400 is difficult.

As shown in FIGS. 8A and 8B, the contact of the indicator 400 with the detection surface 210 of the touch panel 200 is continuously detected by the touch panel system until passage of the indicator 400 through the detection difficult region 211. Therefore, as intended by the user, the image 310 moves following the indicator 400.

However, when the contact of the indicator 400 with the detection surface 210 of the touch panel 200 becomes undetected by the touch panel system at the time of passage through the detection difficult region 211, the above operation by the user is discontinued at that point in time. For this reason, as shown in FIG. 8C, after passage of the indicator 400 through the detection difficult region 211, the image 310 does not follow the indicator 400 against the user's intention.

As thus described, when variations in characteristic of the touch panel occur within the detection surface, the indicator is not correctly detected in the touch panel system, and the user's operation is not correctly recognized in an electronic information device that uses a result of detection of the indicator by the touch panel system, which is problematic. Especially in the case of the foregoing continuous operation such as drag (other than this, flick, pinch-in, pinch-out, etc.), it is more likely that the indicator enters the detection difficult region 211 as compared to the case of a single operation such as touch, and hence it is more likely that the user's operation is not correctly recognized in the electronic information device.

To deal with this problem, there is considered a method of re-setting a detection reference that is used when the touch panel system detects the indicator so as to facilitate detection of the indicator, thereby facilitating detection of the indicator that is in contact with or close to the detection difficult region 211. However, in this method, the possibility is high for the touch panel system to erroneously detect the indicator at a position out of the detection difficult region 211, and the indicator detection accuracy deteriorates, which is problematic.

It is to be noted that in the touch panel system proposed in Patent Document 1, although it is possible to suppress erroneous detection of a change in capacitance due to deflection of the touch panel as contact of the indicator, it is not possible to facilitate detection of the contact of the indicator. For this reason, even the touch panel system proposed in Patent Document 1 has difficulty in detection of the indicator in the detection difficult region 211 and cannot enhance the indicator detection accuracy.

Therefore, an object of the present invention is to provide a touch panel system capable of enhancing the indicator detection accuracy by use of any touch panel, and an electronic information device provided with the touch panel system.

Means for Solving the Problem

In order to achieve the above object, the present invention provides a touch panel system comprising: a touch panel for outputting an output signal in accordance with a presence or absence of an indicator that is in contact with or close to a detection surface; and an indicator position detection unit for detecting a position of the indicator within the detection surface based on the output signal outputted by the touch panel, wherein the indicator position detection unit detects the position of the indicator within the detection surface by use of a detection reference that is set for each predetermined position within the detection surface.

With the above configuration, it is possible to set an appropriate detection reference for each predetermined position within the detection surface. Hence it is possible to prevent a position where detection of the indicator is difficult, and a position where erroneous detection of the indicator frequently occurs, from being generated within the detection surface.

Further, in the touch panel system with the above characteristic, it is preferable that the touch panel include a plurality of drive lines which are provided in parallel to each other along the detection surface, and are each driven by being given a predetermined drive signal, and a plurality of sense lines which are provided in parallel to each other along the detection surface so as to intersect with the drive lines, and each output the output signal in accordance with a capacitance that is formed between a sense line and a drive line by driving of the drive line, and the detection reference that is set for each predetermined position within the detection surface corresponds to distribution of a thickness of at least part of members constituting the touch panel within the detection surface.

With the above configuration, in a projection type capacitive touch panel system, the detection reference is set for each predetermined position (e.g., each intersection between the drive line and the sense line) within the detection surface so as to correspond to distribution of a thickness of the touch panel within the detection surface, the distribution having a large effect on the difficulty in detection of the indicator. Hence it is possible to set a more appropriate detection reference for each predetermined position within the detection surface.

Further, in the touch panel system with the above characteristic, it is preferable that, within the detection surface, the detection reference for making the indicator easier to detect be set at a position where at least part of members constituting the touch panel has a larger thickness.

With the above configuration, even when there is a position where the touch panel has a large thickness and the indicator is difficult to detect within the detection surface, it is possible to locally facilitate detection of the indicator only at that position.

Further, in the touch panel system with the above characteristic, it is preferable that the indicator position detection unit find, for each predetermined position within the detection surface, an amount of change in the capacitance obtained by comparing the capacitance found from the output signal obtained in a state where the indicator that is in contact with or close to the detection surface is not present and the capacitance found from the output signal that is obtained at the time of detecting the position of the indicator within the detection surface, to detect a position where the amount of change in the capacitance is larger than the detection reference as the position of the indicator within the detection surface, and within the detection surface, the smaller detection reference be set at a position where at least part of members constituting the touch panel has a larger thickness.

With the above configuration, even when there is present a position where the touch panel has a large thickness and the indicator is difficult to detect within the detection surface, locally setting the detection reference to low only at that position can facilitate detection of the indicator at that position.

Further, in the touch panel system with the above characteristic, it is preferable that the touch panel include a protective layer provided nearer the detection surface side than the drive lines and the sense lines, and the detection reference that is set for each predetermined position within the detection surface correspond to distribution of a thickness of at least the protective layer within the detection surface.

With the above configuration, the detection reference is set for each predetermined position within the detection surface so as to correspond to distribution of the thickness of the protective layer of the touch panel within the detection surface, the distribution having a large effect on the difficulty in detection of the indicator. Hence it is possible to set a more appropriate detection reference for each predetermined position within the detection surface.

Further, in the touch panel system with the above characteristic, it is preferable that the touch panel include an insulating layer provided nearer the opposite side of the detection surface than the drive lines and the sense lines, and the detection reference that be set for each predetermined position within the detection surface correspond to distribution of a thickness of at least the insulating layer within the detection surface.

With the above configuration, the detection reference is set for each predetermined position within the detection surface so as to correspond to distribution of the thickness of the insulating layer of the touch panel within the detection surface, the distribution having a large effect on the difficulty in detection of the indicator. Hence it is possible to set a more appropriate detection reference for each predetermined position within the detection surface.

Further, it is preferable that the touch panel system with the above characteristic further comprise a detection reference setting unit for setting the detection reference based on a result of processing of the output signal by the indicator position detection unit.

With the above configuration, the detection reference is set based on an actually obtained output signal. Hence it is possible to set a more appropriate detection reference for each predetermined position within the detection surface.

Further, in the touch panel system with the above characteristic, it is preferable that the touch panel include a plurality of drive lines which are provided in parallel to each other along the detection surface, and are each driven by being given a predetermined drive signal, and a plurality of sense lines which are provided in parallel to each other along the detection surface so as to intersect with the drive lines, and each output the output signal in accordance with a capacitance that is formed between the sense line and the drive line by driving of the drive line, and the detection reference setting unit set the detection reference based on the capacitance found by the indicator position detection unit processing the output signal.

With the above configuration, in the projection type capacitive touch panel system, the detection reference is set based on a capacitance that is used directly for determining the detection or non-detection of the indicator. Hence it is possible to set a more appropriate detection reference for each predetermined position (e.g., each intersection between the drive line and the sense line) within the detection surface.

Further, in the touch panel system with the above characteristic, it is preferable that the indicator position detection unit find, for each predetermined position within the detection surface, an amount of change in the capacitance obtained by comparing the capacitance found from the output signal obtained in a state where the indicator that is in contact with or close to the detection surface is not present and the capacitance found from the output signal that is obtained at the time of detecting the position of the indicator within the detection surface, to detect a position where the amount of change in the capacitance is larger than the detection reference as the position of the indicator within the detection surface, and the detection reference setting unit set the smaller detection reference at a position where the amount of change in the capacitance at a time when the indicator comes into contact with the detection surface is smaller.

With the above configuration, the detection reference is set based on an amount of change in the capacitance that is obtained when the indicator actually comes into contact. Hence it is possible to set a more appropriate detection reference for each predetermined position within the detection surface.

Further, it is preferable that the touch panel system with the above characteristic further comprise: a display device for displaying an image; and a host terminal for controlling an image displayed by the display device, and in the touch panel system, the touch panel be provided on a display surface of the display device where the image is displayed, and when the detection reference setting unit sets the detection reference, the host terminal control the image displayed on the display device, to guide the indicator to come into contact with a predetermined position within the detection surface.

With the above configuration, it is possible to reliably collect data necessary for setting an appropriate detection reference.

Further, in the touch panel system with the above characteristic, it is preferable that at the time when the detection reference setting unit sets the detection reference, the host terminal control the display device to display a plurality of input-button images respectively showing different characters on the display device and prompt a user to input a predetermined character string, to guide the indicator to come into contact with a predetermined position within the detection surface.

With the above configuration, since the detection reference is set when the user inputs a character string (characters includes a number, a symbol, etc.) as necessary, it is possible to reliably collect data necessary for setting an appropriate detection reference without making the user feel bothered.

Further, in the touch panel system with the above characteristic, it is preferable that, when the indicator comes into contact with a position of the touch panel within the detection surface that corresponds to a position immediately above any one of the positions of the display device where the input-button images are displayed, the host terminal change an array of the input-button images that are displayed on the display device.

With the above configuration, even when a plurality of same characters are included in a predetermined character string, it is possible to bring the indicator into contact with different positions within the detection surface with respect to the respective characters. Hence it is possible to efficiently collect data necessary for setting an appropriate detection reference. Further, when the predetermined character string is one with high secrecy such as a password, it is possible to prevent the character string from being leaked to a third person surreptitiously observing the user's operation.

Further, it is preferable that the touch panel system with the above characteristic further comprise a display device for displaying an image, and the touch panel be provided on the display surface of the display device where the image is displayed. Moreover, the display device may be a liquid crystal display, a plasma display, an organic EL display or a field emission display.

Further, the present invention provides an electronic information device comprising the touch panel system with the above characteristic.

Effects of the Invention

According to the touch panel system and the electronic information device with the above characteristics, it is possible to set an appropriate detection reference for each predetermined position within the detection surface, so as to prevent a position where detection of the indicator is difficult, and a position where erroneous detection of the indicator frequently occurs, from being generated within the detection surface. Hence it is possible to enhance the indicator detection accuracy even in the case of using any touch panel.

DESCRIPTION OF EMBODIMENT

Hereinafter, as an embodiment of the present invention, a description will be given by illustrating a projection type capacitive touch panel system where a drive line and a sense line are provided along a detection surface of a touch panel.

<Example of Overall Configuration of Touch Panel System>

Figure 1:
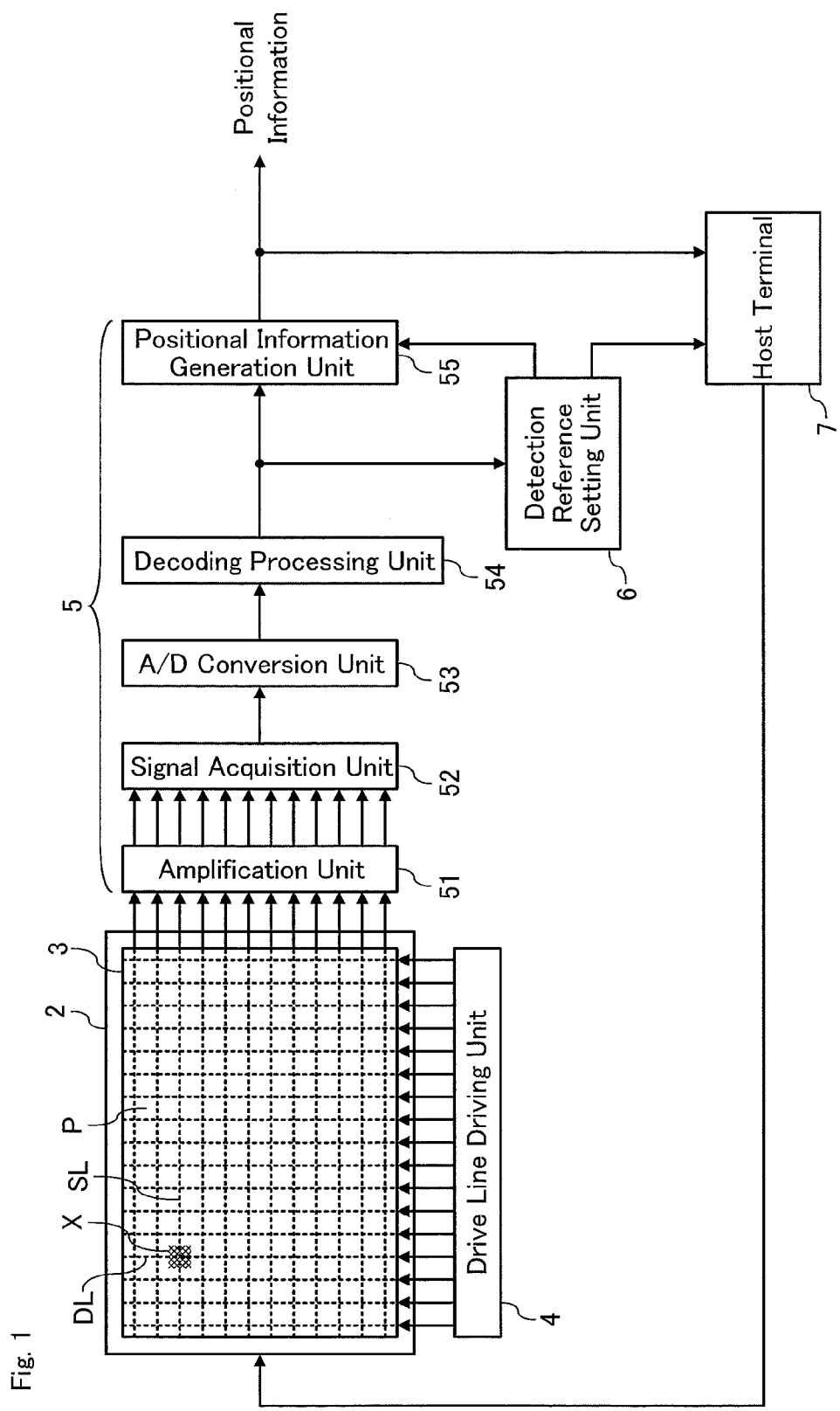
FIG. 1 is a block diagram showing an example of an overall configuration of a touch panel system according to an embodiment of the present invention.

First, an example of an overall configuration of the touch panel system according to the embodiment of the present invention will be described with reference to the drawings. FIG. 1 is a block diagram showing the example of the overall configuration of the touch panel system according to the embodiment of the present invention.

As shown in FIG. 1, a touch panel system 1 is provided with: a display device 2 for displaying an image on a display surface; a touch panel 3 which is provided on the display surface of the display device 2 and outputs an output signal in accordance with the presence or absence of an indicator that is in contact with or close to a detection surface P from a sense line SL by driving of a drive line DL; a drive line driving unit 4 for driving the drive line DL; an indicator position detection unit 5 for processing the output signal outputted by the sense line SL to detect a position of the indicator within the detection surface P; a detection reference setting unit 6 for setting a detection reference that is used when the indicator position detection unit 5 detects the position of the indicator within the detection surface P; and a host terminal 7 for controlling the image displayed by the display device 2.

The display device 2 is made up of a liquid crystal display, a plasma display, an organic EL display, a field emission display, or the like, for example. It is to be noted that the display device 2 is not restricted to these, but may be any kind.

The touch panel 3 is provided with: a plurality of drive lines DL which are provided in parallel to each other along the detection surface P, and are each driven by being given a predetermined drive signal; and a plurality of sense lines SL which are provided in parallel to each other along the detection surface P so as to intersect (three-dimensionally intersect) with the drive line DL, and outputs the output signal in accordance with a capacitance that is formed between the sense line SL and the drive line DL by driving of the drive line DL.

The output signal serves as a signal showing whether the indicator is in contact with or close to a detection region X (an intersecting portion between the drive line DL and the sense line SL or a portion in the vicinity thereof, hereinafter) within the detection surface P (whether or not the indicator is in contact with or close to the detection region X, a clearance between the detection region X and the indicator, etc.), and the smaller the clearance between the detection region X and the indicator is, the smaller the capacitance is. It should be noted that, although FIG. 1 illustrates the case where the drive line DL and the sense line SL vertically intersect, they may intersect at an angle other than a vertical angle.

The drive line driving unit 4 drives the drive line DL by applying a predetermined signal to the drive line DL. When the drive line DL is driven, the sense line SL intersecting with the driven drive line DL outputs an output signal in accordance with a capacitance that is formed between the sense line SL and the driven drive line DL. At this time, when the drive line driving unit 4 simultaneously drives a plurality of drive lines DL, one sense line SL outputs an output signal corresponding to a plurality of capacitances formed between the sense line SL and the plurality of drive lines DL, but the indicator position detection unit 5 can find each of the capacitances from such an output signal corresponding to the superimposing capacitances by decoding processing of a decoding processing unit 54 described later.

The indicator position detection unit 5 is provided with: an amplification unit 51 for amplifying an output signal outputted by the sense line SL; a signal acquisition unit 52 for acquiring the output signal amplified by the amplification unit 51, to output the acquired signal in a time division manner; an A/D conversion unit 53 for converting an analog signal outputted by the signal acquisition unit 52 to a digital signal; the decoding processing unit 54 for finding distribution of an amount of change in capacitance within the detection surface P based on the digital signal converted by the A/D conversion unit 53; and a positional information generation unit 55 for detecting a position of the indicator within the detection surface P based on the distribution of the amount of change in capacitance acquired by the decoding processing unit 54, to generate positional information showing that position.

The decoding processing unit 54 performs decoding processing on the digital signal obtained from the A/D conversion unit 53 based on a pattern of the drive signal given to the drive line DL by the drive line driving unit 4, thereby finding distribution (two-dimensional distribution) of the capacitances within the detection surface P. Further, before the detection of the indicator (e.g., at the time of calibration that is performed immediately after start-up of the touch panel system), the decoding processing unit 54 acquires a digital signal found from an output signal obtained in a state where the indicator that is in contact with or close to the detection surface P is not present, thereby previously finding distribution (two-dimensional distribution) of the capacitances within the detection surface P in the state where the indicator that is in contact with or close to the detection surface P is not present.

The decoding processing unit 54 then compares the distribution of the capacitances within the detection surface P in the state where the indicator that is in contact with or close to the detection surface P is not present and the distribution of the capacitances within the detection surface P found at the time of detecting the position of the indicator, thereby finding distribution of an amount of change in capacitance within the detection surface P (namely, two-dimensional distribution of components of capacitances having changed due to the indicator coming into contact with or close to the detection surface P).

Specifically, for example, the decoding processing unit 54 subtracts the distribution of the capacitances within the detection surface P found at the time of detecting the position of the indicator from the distribution of the capacitances within the detection surface P in the state where the indicator that is in contact with or close to the detection surface P is not present, thereby finding distribution of the amount of change in capacitance within the detection surface P. It is to be noted that the amount of change in capacitance may be one made to be an absolute value.

The positional information generation unit 55 compares the distribution of the amount of change in capacitance within the detection surface P obtained by the decoding processing unit 54 and a detection reference having been set for each predetermined position within the detection surface P (e.g., having been two-dimensionally set for each intersection between the sense line SL and the drive line DL or for each detection region X), thereby finding the position of the indicator within the detection surface P and generating positional information.

Specifically, the positional information generation unit 55 detects a position where the amount of change in capacitance is larger than the detection reference, and finds that position as a position of the indicator in contact with or close to the detection surface P. The positional information generation unit 55 then generates and outputs positional information showing that position. It is to be noted that in a case where the positional information generation unit 55 is unable to find the position of the indicator in contact with or close to the detection surface P, such as a case where the indicator that is in contact with or close to the detection surface P is not present, the positional information generation unit 55 may generate and output positional information showing that fact. Further, a detail of the detection reference will be described later.

The detection reference setting unit 6 sets the detection reference for use in the positional information generation unit 55 based on the distribution of the amount of change in capacitance obtained from the decoding processing unit 54. Specifically, for example, the positional information generation unit 55 stores the detection reference found by the detection reference setting unit 6. It should be noted that a detail of an operation of the detection reference setting unit 6 will be described later by giving an example of a specific operation.

The host terminal 7 controls the whole of the touch panel system 1, and especially controls an image displayed on the display device 2. It is to be noted that, although not particularly shown in FIG. 1, the host terminal 7 can control each unit such as the drive line driving unit 4 and the indicator position detection unit 5. Further, a detail of an operation of the host terminal 7 will be described later by giving an example of a specific operation.

<Setting Method for Detection Reference>

Figure 2A:
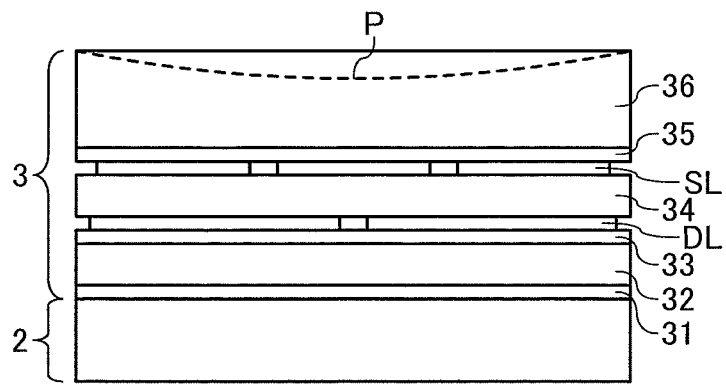
FIGS. 2A and 2B are side views showing examples of a structure of a touch panel.
Figure 2B:
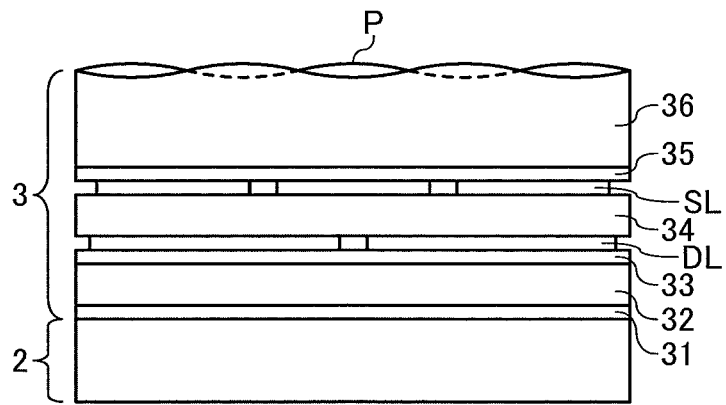

Next, a setting method for the detection reference will be described with reference to the drawings. First, examples of a structure of the touch panel 3 will be described with reference to FIGS. 2A and 2B and FIGS. 3A and 3B. FIGS. 2A and 2B are side views showing the examples of the structure of the touch panel, and FIGS. 3A and 3B are plan views showing examples of a structure of the drive line and the sense line.

As shown in FIGS. 2A and 2B, the touch panel 3 is provided with: an adhesive layer 31 formed on the display surface of the display device 2; a glass substrate 32 formed on the adhesive layer 31; an insulating film (insulating layer) 33 formed on the glass substrate; the drive line DL formed on the insulating film 33; a glass substrate 34 formed on the drive line DL; the sense line SL formed on the glass substrate 34; an adhesive layer 35 formed on the sense line SL; and a cover glass (protective layer) 36 formed on the adhesive layer 35. It is to be noted that each member constituting the touch panel 3 is made transparent (or made to be one obtained by combining fine structures to such an extent as to have no effect on viewing) so that the image displayed by the display device 2 is viewable from the outside.

Figure 3A:
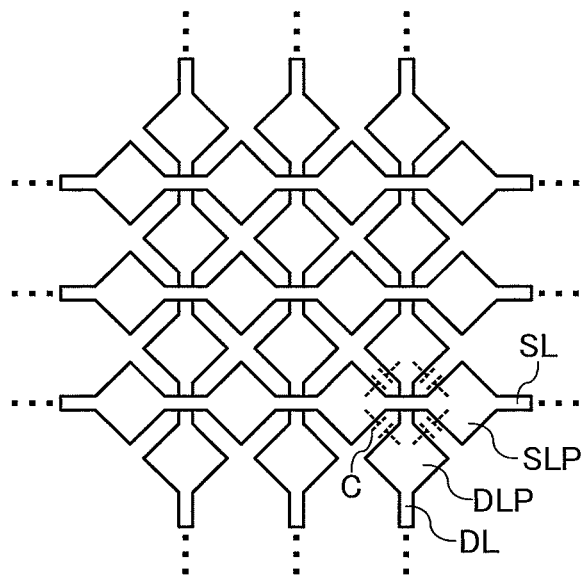
FIGS. 3A and 3B are plan views showing examples of a structure of a drive line and a sense line.
Figure 3B:
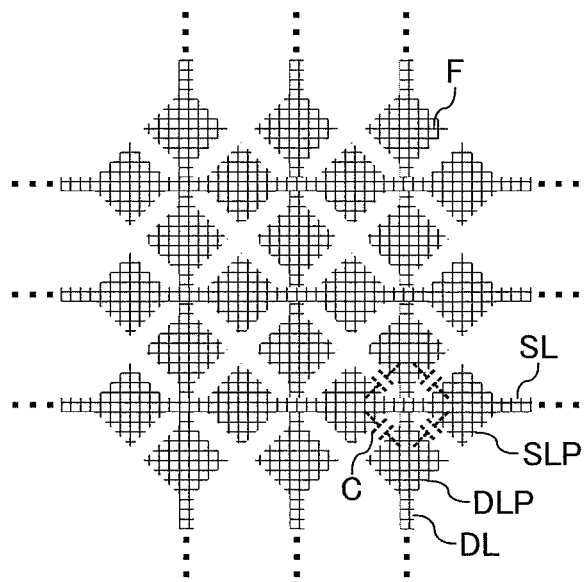

Further, as shown in FIGS. 3A and 3B, the drive line DL is provided with a drive line pad unit DLP where an area locally increases, except for a portion intersecting with the sense line SL. Similarly, the sense line SL is provided with a sense line pad unit SLP where an area locally increases, except for a portion intersecting with the drive line DL. As shown in FIGS. 3A and 3B, at the portion where the drive line DL and the sense line SL intersect, a capacitance C is formed between the drive line DL and the sense line SL (especially between the adjacent drive line pad unit DLP and sense line pad unit SLP). It should be noted that the drive line DL may not be provided with the drive line pad unit DLP, and the sense line SL may not be provided with the sense line pad unit SLP. Even in this case, the capacitance C is formed at the portion where the drive line DL and the sense line SL intersect. Further, the example shown in FIG. 3A indicates a case where the drive line DL and the sense line SL are composed of a transparent material such as ITO (Indium Tin Oxide). Further, the example shown in FIG. 3B indicates a case where the drive line DL and the sense line SL are composed of meshes of thin metallic wire F.

As described above, when the touch panel 3 is made larger in size, variations in thickness of the touch panel 3 may occur within the detection surface P. Specifically, for example, variations in thickness of the cover glass 36 may occur within the detection surface P. It is to be noted that FIG. 2A illustrates a case where the cover glass 36 has a smaller thickness at a position closer to the central side, and has a larger thickness at a position closer to the peripheral side, and the front surface has a recessed shape as a whole. Further, FIG. 2B illustrates a case where a position at which the cover glass 36 has a large thickness and a position at which the cover glass 36 has a small thickness are mixed, and the front surface has an uneven shape as a whole.

Figure 8A:
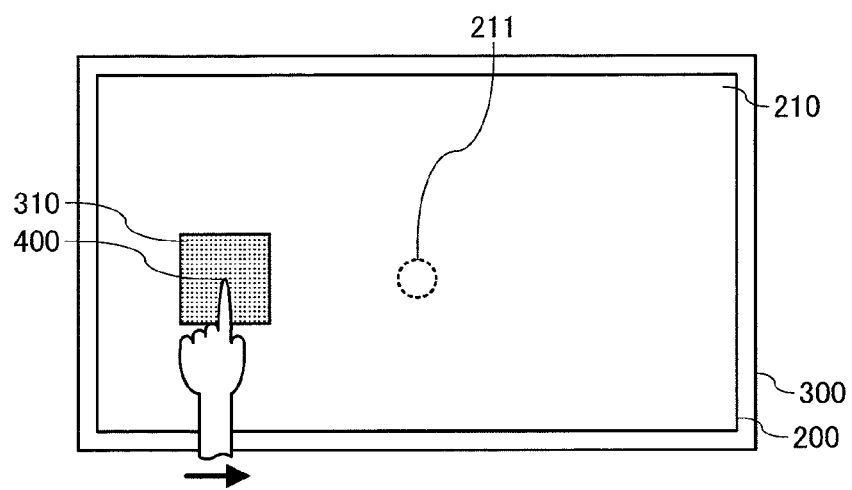
FIGS. 8A to 8C are views showing a specific example of a problem in a conventional touch panel system.
Figure 8B:
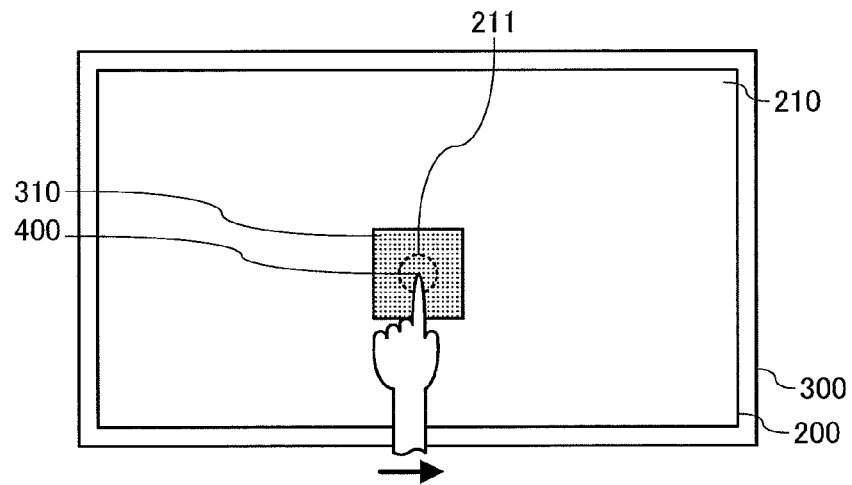
Figure 8C:
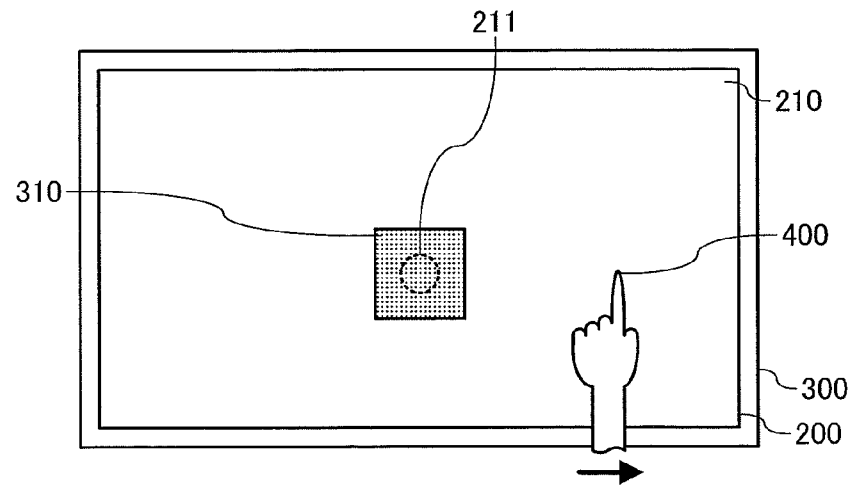

In this case, at the position where the cover glass 36 has a small thickness, when the indicator comes into contact with or close to the detection surface P, a distance between the sense line SL and the drive line DL and the indicator is small, and hence the amount of change in capacitance is large. In contrast, at the position where the cover glass 36 has a large thickness, when the indicator comes into contact with or close to the detection surface P, the distance between the sense line SL and the drive line DL and the indicator is large, and hence the amount of change in capacitance is small (the position can be the detection difficult region 211 shown in FIGS. 8A to 8C). It is to be noted that this does not apply only to the cover glass 36, but a similar problem can occur when any member closer to the front surface side (detection surface P side) than the sense line SL and the drive line DL is thicker.

Further, for example, variations in thickness of the insulating film 33 may also occur within the detection surface P. In this case, at a position where the insulating film 33 has a small thickness, the capacitance is large since a distance between the sense line SL and the drive line DL and the display device 2 (ground potential) is small, and hence the amount of change in capacitance at a time when the indicator comes into contact with or close to the detection surface P is large. In contrast, at a position where the insulating film 33 has a large thickness, the capacitance is small since the distance between the sense line SL and the drive line DL and the display device 2 (ground potential) is large, and hence the amount of change in capacitance at a time when the indicator comes into contact with or close to the detection surface P is small (the position can be the detection difficult region 211 shown in FIGS. 8A to 8C). It is to be noted that this does not apply only to the insulating film 33, but a similar problem can occur when any member closer to the rear surface side (the opposite side to the detection surface P side) than the sense line SL and the drive line DL is thicker.

Further, there is assumed a case where variations in thickness of the glass substrate 34 between the sense line SL and the drive line DL occur. In this case, at a position where the glass substrate 34 has a small thickness, the capacitance is large since a distance between the sense line SL and the drive line DL is small, and hence the amount of change in capacitance at a time when the indicator comes into contact with or close to the detection surface P is large. In contrast, at a position where the glass substrate 34 has a large thickness, the capacitance is small since the distance between the sense line SL and the drive line DL is large, and hence the amount of change in capacitance at a time when the indicator comes into contact with or close to the detection surface P is small (the position can be the detection difficult region 211 shown in FIGS. 8A to 8C). It is to be noted that this does not apply only to the glass substrate 34, but a similar problem can occur when any member between the sense line SL and the drive line DL is thick.

As described above, there is a correlation between the distribution of the thickness of the touch panel 3 within the detection surface P and the distribution of the amount of change in capacitance within the detection surface P at a time when the indicator comes into contact with or close to the detection surface P. In particular, the amount of change in capacitance at a time when the indicator comes into contact with or close to the detection surface P is smaller at the position where the touch panel 3 has a larger thickness, and that position is a position where the indicator is difficult for the positional information generation unit 55 to detect by. Therefore, in the touch panel system 1, the detection reference is set for each predetermined position within the detection surface P so as to correspond to the distribution of the thickness of the touch panel 3 within the detection surface P.

Figure 4A:
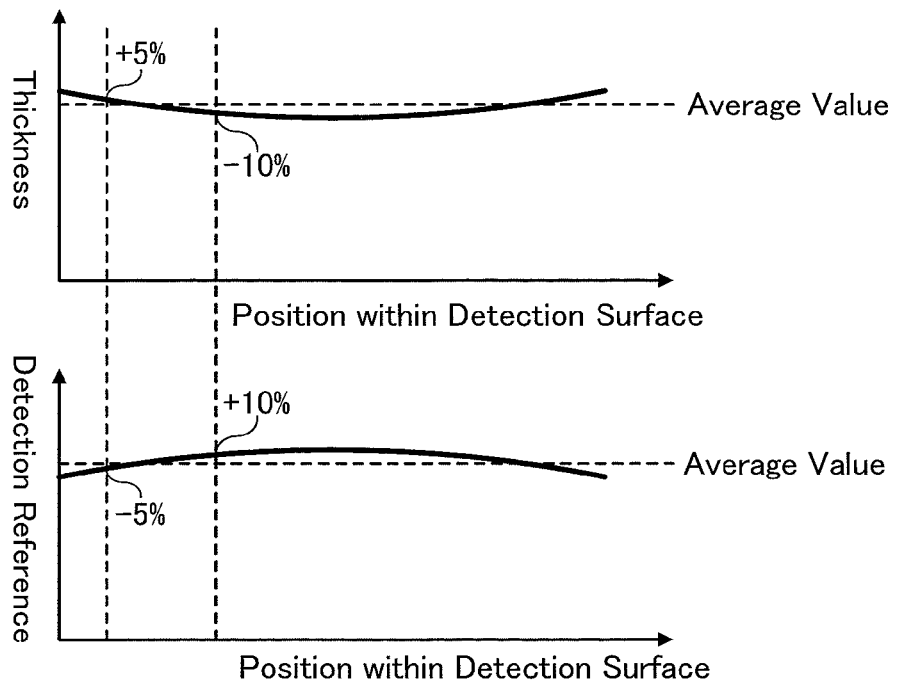
FIGS. 4A and 4B are graphs showing examples of a setting method for a detection reference.
Figure 4B:
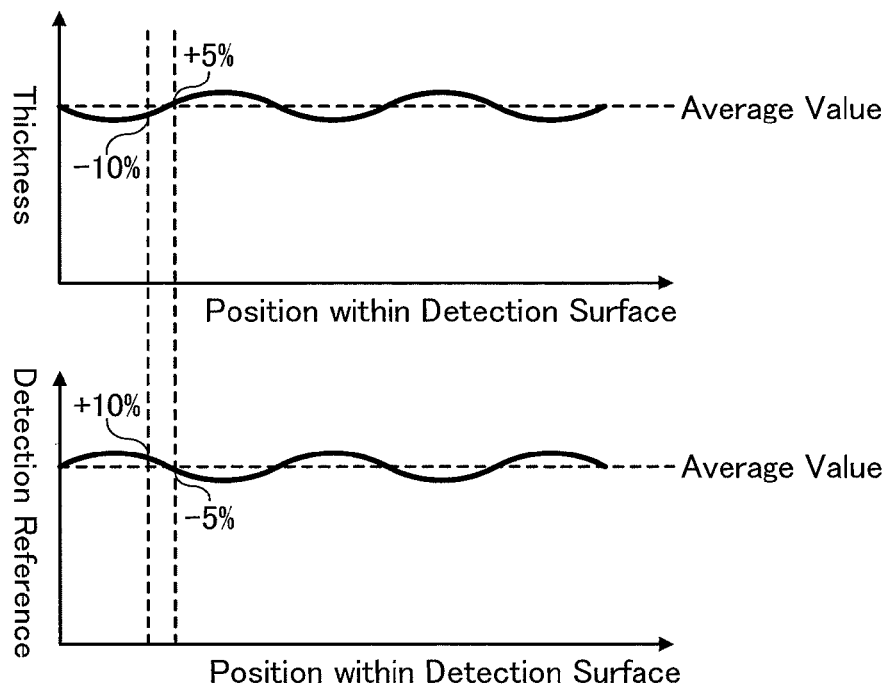

Examples of the setting method for the detection reference will be described with reference to FIGS. 4A and 4B. FIGS. 4A and 4B are graphs showing examples of the setting method for the detection reference. It is to be noted that the respective graphs shown in each of FIGS. 4A and 4B show a position in a predetermined direction (e.g., a direction along the sense line SL, a direction along the drive line DL) within the detection surface P, the thickness of the touch panel 3, and the detection reference.

In the graph shown in FIG. 4A, in the predetermined direction within the detection surface P, the touch panel 3 has a smaller thickness at a position closer to the central side, and it has a larger thickness at a position closer to the peripheral side. Further, in the graph shown in FIG. 4B, in the predetermined direction within the detection surface P, a position where the touch panel 3 has a large thickness and a position where the touch panel 3 has a small thickness are mixed. It is to be noted that in FIGS. 4A and 4B, the thickness of the touch panel 3 and the detection reference are shown such that they change only with respect to the predetermined direction within the detection surface P in order to simplify the drawings, but they actually change with respect to the detection surface P.

In the specific examples shown in FIGS. 4A and 4B, considering the foregoing relation between the thickness of the touch panel 3 and the difficulty in detection of the indicator, the detection reference is set such that the detection reference is smaller at a position where the touch panel 3 within the detection surface P has a larger thickness and the detection reference is larger at a position where the touch panel 3 within the detection surface P has a smaller thickness.

Specifically, for example, when the thickness of the touch panel 3 at a certain position within the detection surface P is larger than an average value of the thickness of the touch panel 3 by 5%, a detection reference smaller than an average value of the detection reference by 5% is set. Similarly, when the thickness of the touch panel 3 at a certain position within the detection surface P is smaller than the average value of the thickness of the touch panel 3 by 10%, a detection reference larger than the average value of the detection reference by 10% is set. It is to be noted that the average value of the detection reference may be previously set before the setting of the detection reference.

From the above, in the touch panel system 1 according to the embodiment of the present invention, it is possible to set an appropriate detection reference for each predetermined position within the detection surface P, so as to prevent a position where detection of the indicator is difficult, and a position where erroneous detection of the indicator frequently occurs, from being generated within the detection surface P. Hence it is possible to enhance the indicator detection accuracy in the case of using any touch panel 3.

In particular, even when there is a position where the touch panel 3 has a large thickness and the indicator is difficult to detect within the detection surface P, locally setting the detection reference to low only at that position can facilitate detection of the indicator at that position.

<Specific Operation for Setting Detection Reference>

Figure 5:
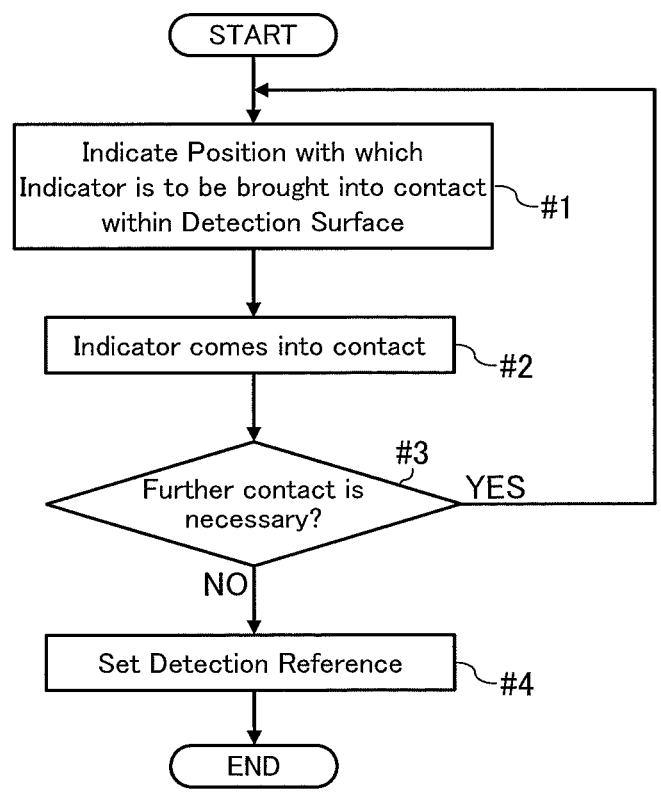
FIG. 5 is a flowchart showing an example of a specific operation for setting the detection reference.

In order to set the detection reference as described above, it is of necessity to find distribution of the thickness of the touch panel 3 within the detection surface P by some method. Hereinafter, with reference to the drawings, a description will be given of a specific operation for setting the detection reference, including an operation of finding the distribution of the thickness of the touch panel 3 within the detection surface P. FIG. 5 is a flowchart showing an example of the specific operation for setting the detection reference. It is to be noted that the operation in the flowchart shown in FIG. 5 is performed mainly at the time of start-up of the touch panel system 1, at the time when re-setting of the detection reference is instructed by the user, or at some other time.

As shown in FIG. 5, when the setting of the detection reference is started, first, the detection reference setting unit 6 indicates to the host terminal 7 a position with which the indicator is to be brought into contact within the detection surface P. Accordingly, the host terminal 7 controls an image displayed on the display device 2 to indicate to the user the position with which the indicator is to be brought into contact (Step #1).

Figure 6A:
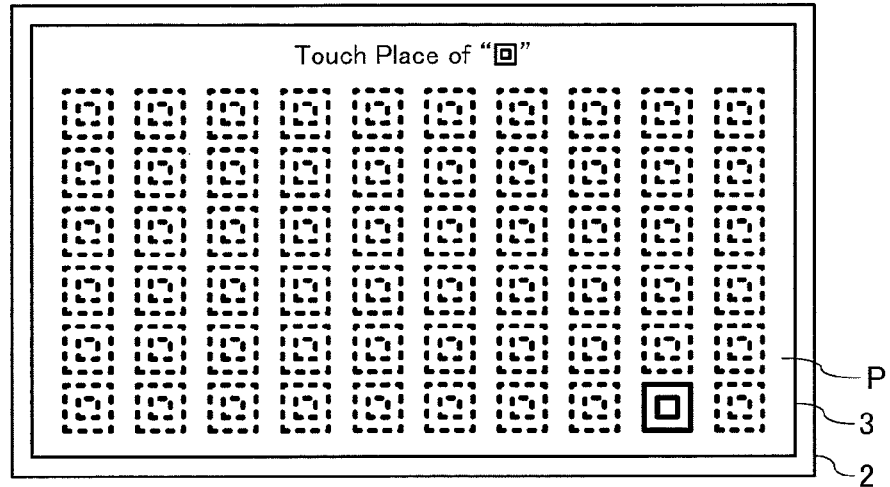
FIGS. 6A and 6B are views showing specific examples of an image that is displayed on a display surface of a display device at the time of setting the detection reference.
Figure 6B:
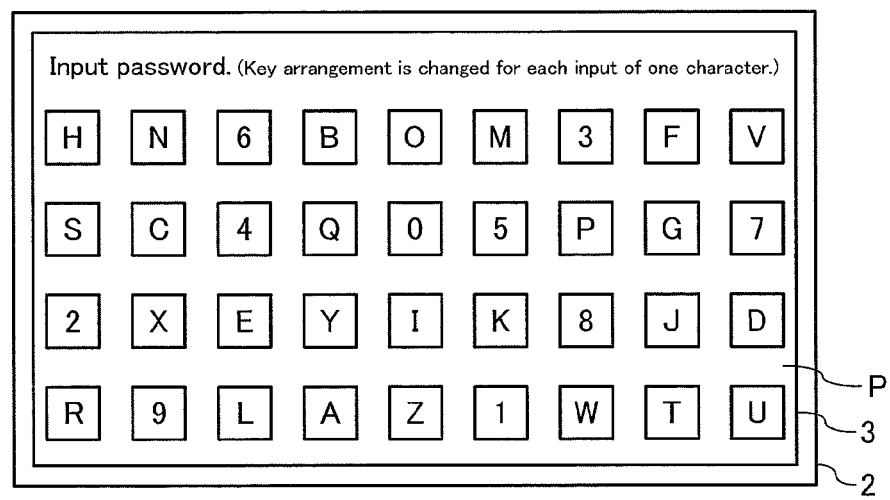

Specific examples of the image displayed on the display device 2 at this time will be described with reference to FIGS. 6A and 6B. FIGS. 6A and 6B are views showing the specific examples of the image that is displayed on the display surface of the display device at the time of setting the detection reference.

FIG. 6A shows a case where an image arrayed with a plurality of double rings (figures similar to a Chinese character "KAI") is displayed on the display surface of the display device 2. The host terminal 7 displays with a solid line only a double ring with which the indicator is to be brought into contact within the detection surface P, thereby explicitly indicating to the user the position with which the indicator is to be brought into contact. The user having looked at this image is then guided so as to bring the indicator such as his or her finger into contact with a displayed position of the double ring displayed with the solid line.

Meanwhile, FIG. 6B shows a case where an image arrayed with a plurality of input buttons are shown, the input buttons respectively showing different characters (including numbers, symbols, etc.). The host terminal 7 implicitly indicates the user the position with which the indicator is to be brought into contact within the detection surface P, regarding that an input-button image of the position with which the indicator is to be brought into contact as one showing a predetermined character constituting a character string such as a password that the user has recognized, for example. The user having looked at this image is then guided so as to bring the indicator such as his or her finger into contact with a displayed position of the input-button image showing the predetermined character.

In the case of the example shown in FIG. 6A, when the user brings the indicator into contact with the displayed position of the double ring shown with the solid line (Step #2), the detection reference setting unit 6 acquires and stores an amount of change in capacitance at that position from distribution of the amount of change in capacitance outputted by the decoding processing unit 54. The detection reference setting unit 6 then checks whether or not the contact of the indicator with the detection surface P is further necessary (Step #3).

When the contact of the indicator with the detection surface P is further necessary (Step #3, YES), the detection reference setting unit 6 again indicates to the host terminal 7 a position with which the indicator is to be brought into contact within the detection surface P (especially a position different from the position indicated the last time) (Step #1). In contrast, when the contact of the indicator with the detection surface P is not necessary (Step #3, NO), the detection reference setting unit 6 sets the detection reference (Step #4), and the operation is completed.

Meanwhile, in the case of the example shown in FIG. 6B, when the user brings the indicator into contact with the displayed position of the input-button image (Step #2), the detection reference setting unit 6 acquires and stores an amount of change in capacitance at that position from distribution of the amount of change in capacitance outputted by the decoding processing unit 54. The detection reference setting unit 6 then checks whether or not the contact of the indicator with the detection surface P is further necessary (whether or not the input of the character string has been completed) (Step #3).

When the contact of the indicator with the detection surface P is further necessary (when the input of the character string has not been completed, Step #3, YES), the detection reference setting unit 6 again indicates to the host terminal 7 a position with which the indicator is to be brought into contact within the detection surface P (especially a position different from the position indicated the last time) (Step #1). In contrast, when the contact of the indicator with the detection surface P is not necessary (when the input of the character string has been completed, Step #3, NO), the detection reference setting unit 6 sets the detection reference (Step #4), and the operation is completed.

Incidentally, in the case of the example shown in FIG. 6B, when the indicator comes into contact with the displayed position of the input-button image (strictly speaking, a position of the touch panel 3 within the detection surface P that corresponds to a position immediately above the displayed position) (Step #2), the host terminal 7 changes the array of the input-button images that are displayed on the display device 2. Accordingly, even when a plurality of same characters are included in the character string, it is possible to bring the indicator into contact with different positions within the detection surface P with respect to the respective characters. Hence it is possible to efficiently collect data necessary for setting an appropriate detection reference. Further, when the above character string is one with high secrecy such as a password, it is possible to prevent the character string from being leaked to a third person surreptitiously observing the user's operation.

At the point in time of performing Step #4 above, the detection reference setting unit 6 stores the amount of change in capacitance at the time when the indicator comes into contact with the detection surface P with respect to a number of positions within the detection surface P. As described above, there is a correlation between the distribution of the thickness of the touch panel 3 within the detection surface P and the distribution of the amount of change in capacitance within the detection surface P at the time when the indicator comes into contact with the detection surface P. Hence the detection reference setting unit 6 can find the distribution of the thickness of the touch panel 3 within the detection surface P from the distribution of the amount of change in capacitance within the detection surface P at the time when the indicator comes into contact with the detection surface P. The detection reference setting unit 6 then sets the detection reference for each predetermined position within the detection surface P so as to correspond to the distribution of the thickness of the touch panel 3 within the detection surface P, as described above.

It should be noted that in the present example of the operation, the detection reference setting unit 6 may directly set the detection reference for each predetermined position within the detection surface P based on the distribution of the amount of change in capacitance within the detection surface P at the time when the indicator comes into contact with the detection surface P. That is, in the present example of the operation, the detection reference setting unit 6 may set the detection reference for each predetermined position within the detection surface P without finding the distribution of the thickness of the touch panel 3 within the detection surface P. In this case, without being restricted by the distribution of the thickness of the touch panel 3 within the detection surface P, it is possible to set a detection reference corresponding to another factor that has an effect on the difficulty in detection of the indicator.

Further, in the present example of the operation, from the viewpoint of avoiding an excessive load on the user, it is preferable not to set the number of times of contact of the indicator with the detection surface P (number of times of repeating Steps #1 and #2) to so large a number. However, when the number of times of contact of the indicator with the detection surface P is made small, the number of amounts of change in capacitance at the time when the indicator comes into contact with the detection surface P, which can be acquired by the detection reference setting unit 6, is small.

Therefore, the detection reference setting unit 6 may perform interpolation processing or the like as necessary, to generate data necessary for setting the detection reference. For example, the detection reference setting unit 6 may perform two-dimensional interpolation on any one of the distribution of the amount of change in capacitance within the detection surface P at the time when the indicator comes into contact with the detection surface P, the distribution of the thickness of the touch panel 3 within the detection surface P, and the detection reference that is set for each predetermined position within the detection surface P, in a predetermined direction (e.g., a direction along the sense line SL, a direction along the drive line DL) within the detection surface P, or the detection reference setting unit 6 may perform three-dimensional interpolation on the whole of the detection surface P.

<Electronic Information Device>

Figure 7:
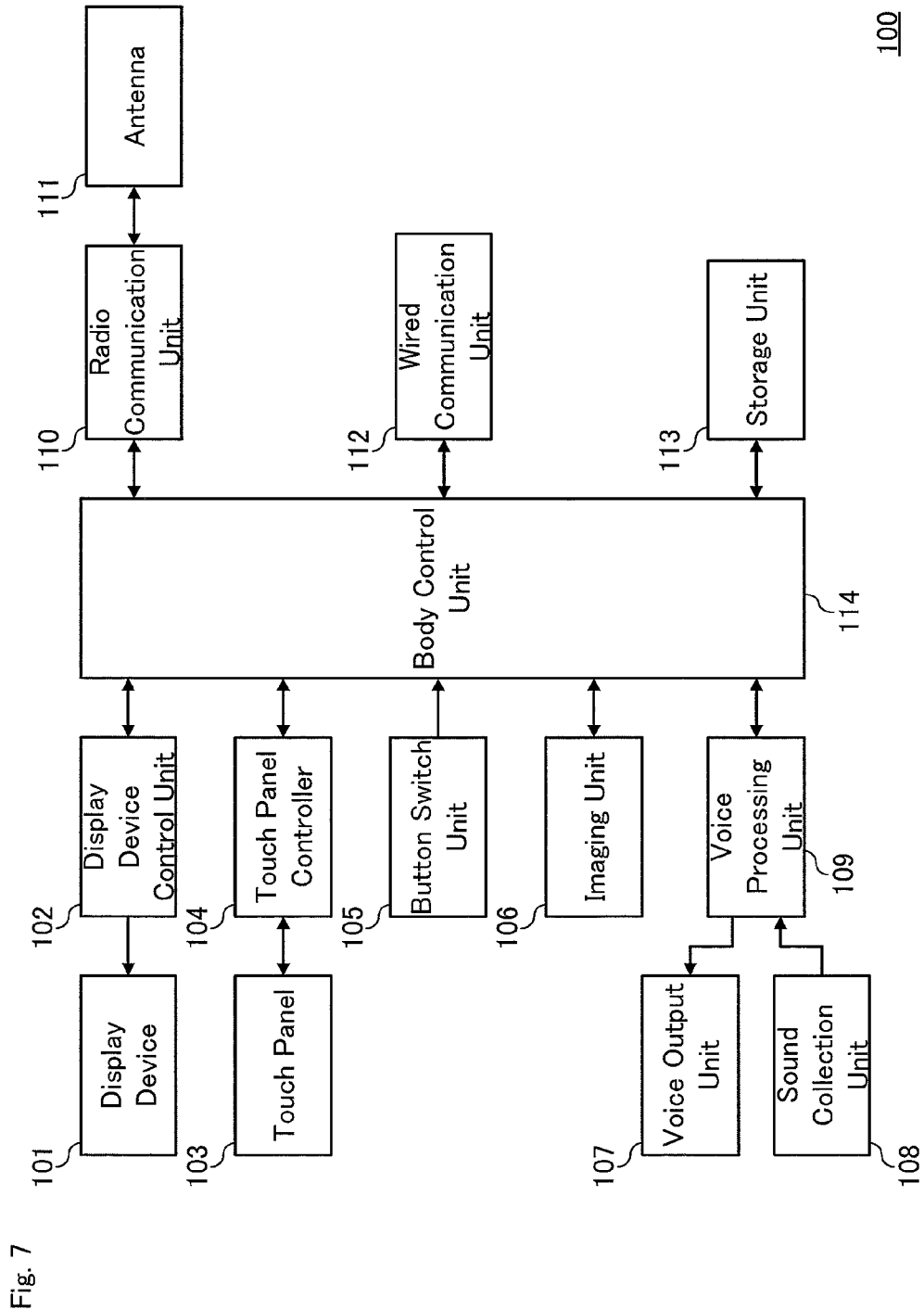
FIG. 7 is a block diagram showing an example of a configuration of an electronic information device according to the embodiment of the present invention.

An example of a configuration of an electronic information device according to the embodiment of the present invention provided with the foregoing touch panel system 1 will be described with reference to FIG. 7. FIG. 7 is a block diagram showing the example of the configuration of the electronic information device according to the embodiment of the present invention.

As shown in FIG. 7, an electronic information device 100 according to the embodiment of the present invention includes: a display device 101 (corresponding to the display device 2 of FIG. 1); a display device control unit 102 for controlling the display device 101; a touch panel 103 (corresponding to the touch panel 3 of FIG. 1); a touch panel controller 104 (corresponding to the drive line driving unit 4, the indicator position detection unit 5 and the detection reference setting unit 6 of FIG. 1); a button switch unit 105 for accepting the user's instruction by being pressed by the user; an imaging unit 106 for generating image data by imaging; a voice output unit 107 for outputting inputted voice data as a voice; a sound collection unit 108 for collecting voice data by collecting sound; a voice processing unit 109 for performing processing on the voice data that is given to the voice output unit 107 or processing on the voice data that is given from the sound collection unit 108; a radio communication unit 110 for communicating communication data to and from an external device of the electronic information device 100 by radio; an antenna 111 for emitting the communication data communicated by the radio communication unit 110 by radio as an electromagnetic wave and receives an electromagnetic wave emitted from the external device of the electronic information device 100; a wired communication unit 112 for communicating communication data to and from the external device of the electronic information device 100 by wire; a storage unit 113 for storing a variety of data; and a body control unit 114 (corresponding to the host terminal 7) for controlling the whole operation of the electronic information device 100.

It is to be noted that part or all of the foregoing indicator position detection unit 5 and detection reference setting unit 6 may not be the touch panel controller 104 but be part of the body control unit 114. Further, the electronic information device 100 shown in FIG. 7 is merely one example of application of the touch panel system 1. The foregoing touch panel system 1 is also applicable to an electronic information device having a different configuration from that of the electronic information device 100

<Modification, Etc.>

The detection reference that is set for each predetermined position within the detection surface P may correspond to the distribution of the thickness of the touch panel 3 within the detection surface P as described above, but may also correspond to distribution of a thickness of at least part of members constituting the touch panel 3 within the detection surface P. In this case, it is preferable to set the detection reference for each predetermined position within the detection surface P so as to correspond to distribution of a thickness of a member within the detection surface P (e.g. the foregoing cover glass 36, insulating film 33, etc.) whose thickness easily varies and which has a large effect on the difficulty in detection of the indicator.

Further, the detection reference setting unit 6 may find the distribution of the thickness of the touch panel 3 within the detection surface P by a method other than the foregoing method (method of using the amount of change in capacitance obtained at the time when the user brings the indicator into contact with the detection surface P).

For example, the detection reference setting unit 6 may find the distribution of the thickness of the touch panel 3 within the detection surface P based not on absolute magnitude of the amount of change in capacitance at the time when the indicator comes into contact with the detection surface P, but based on relative magnitude thereof. Specifically, for example, the detection reference setting unit 6 may find the distribution of the thickness of the touch panel 3 within the detection surface P by use of a ratio between the amount of change in capacitance at the time when the indicator comes into contact with the detection surface P, the amount being obtained in the touch panel manufactured having a uniform thickness as designed, and the amount of change in capacitance at the time when the indicator comes into contact with the detection surface P, the amount being obtained in the actual touch panel 3.

Further, for example, before shipment of the touch panel system 1 (or the electronic information device 100), the distribution of the thickness of the touch panel 3 within the detection surface P may actually be measured. Moreover, for example, before shipment of the touch panel system 1 (or the electronic information device 100), the distribution of the thickness of the touch panel 3 within the detection surface P may be found by use of a test device for processing output signals obtained by bringing the indicator into contact with a variety of positions within the detection surface P to find the amount of change in capacitance at the time when the indicator comes into contact with the detection surface P. In these cases, the detection reference setting unit 6 and the host terminal 7 may not be provided in the touch panel system 1.

Further, at the time of normal operation of the touch panel system 1, the detection reference setting unit 6 may always store the amount of change in capacitance at the time when the indicator comes into contact with the detection surface P, thereby dynamically setting (updating) the detection reference.

INDUSTRIAL APPLICABILITY

The touch panel system according to the present invention is preferably applicable to a large-sized touch panel system, and the like, for example.

DESCRIPTION OF SYMBOLS 1 touch panel system
2 display device
3 touch panel
31 adhesive layer
32 transparent substrate
33 insulating film (insulating layer)
34 transparent substrate
35 adhesive layer
36 cover glass (protective layer)
4 drive line driving unit
5 indicator position detection unit
51 amplification unit
52 signal acquisition unit
53 A/D conversion unit
54 decoding processing unit
55 positional information generation unit
6 detection reference setting unit
7 host terminal
100 electronic information device
DL drive line
SL sense line
P detection surface
X detection region

The invention claimed is:

1. A touch panel system, comprising:
a touch panel for outputting an output signal in accordance with a presence or absence of an indicator that is in contact with or close to a detection surface; and
an indicator position detection circuit configured to detect a position of the indicator within the detection surface based on the output signal outputted by the touch panel, wherein the indicator position detection circuit detects the position of the indicator within the detection surface by use of a detection reference that is set for each predetermined position within the detection surface,
the touch panel includes
a plurality of drive lines which are provided in parallel to each other along the detection surface, and are each driven by being given a predetermined drive signal, and
a plurality of sense lines which are provided in parallel to each other along the detection surface so as to intersect with the drive lines, and each output the output signal in accordance with a capacitance that is formed between a sense line and a drive line by driving of the drive line, and
the detection reference that is set for each predetermined position within the detection surface corresponds to an uneven distribution of a thickness of at least part of a member constituting the touch panel within the detection surface due to an undulation in a surface of the at least part of the members constituting the touch panel.

2. The touch panel system according to claim 1, wherein the indicator position detection circuit unit finds, for each predetermined position within the detection surface, an amount of change in the capacitance obtained by comparing the capacitance found from the output signal obtained in a state where the indicator that is in contact with or close to the detection surface is not present and the capacitance found from the output signal that is obtained at a time of detecting the position of the indicator within the detection surface, to detect a position where the amount of change in the capacitance is larger than the detection reference as the position of the indicator within the detection surface, and
within the detection surface, the smaller detection reference is set at a position where at least part of members constituting the touch panel has a larger thickness.

3. The touch panel system according to claim 1, wherein
the touch panel includes a protective layer provided nearer a detection surface side than the drive lines and the sense lines, and
the detection reference that is set for each predetermined position within the detection surface corresponds to distribution of a thickness of at least the protective layer within the detection surface.

4. The touch panel system according to claim 1, wherein
the touch panel includes an insulating layer provided nearer a side opposite to the detection surface than the drive lines and the sense lines, and
the detection reference that is set for each predetermined position within the detection surface corresponds to distribution of a thickness of at least the insulating layer within the detection surface.

5. The touch panel system according to claim 1, further comprising
a detection reference setting circuit configured to set the detection reference based on a result of processing of the output signal by the indicator position detection circuit.

6. The touch panel system according to claim 5, wherein
the detection reference setting circuit sets the detection reference based on the capacitance found by the indicator position detection circuit processing the output signal.

7. The touch panel system according to claim 6, wherein
the indicator position detection circuit finds, for each predetermined position within the detection surface, an amount of change in the capacitance obtained by comparing the capacitance found from the output signal obtained in a state where the indicator that is in contact with or close to the detection surface is not present and the capacitance found from the output signal that is obtained at a time of detecting the position of the indicator within the detection surface, to detect a position where the amount of change in the capacitance is larger than the detection reference as the position of the indicator within the detection surface, and
within the detection surface, the detection reference setting circuit sets the smaller detection reference at a position where the amount of change in the capacitance at a time when the indicator comes into contact with the detection surface is smaller.

8. The touch panel system according to claim 5, further comprising:
a display device for displaying an image; and
a host terminal for controlling an image displayed by the display device,
wherein the touch panel is provided on a display surface of the display device where the image is displayed, and
when the detection reference setting circuit sets the detection reference, the host terminal controls the image displayed on the display device, to guide the indicator to come into contact with a predetermined position within the detection surface.

9. The touch panel system according to claim 8, wherein
when the detection reference setting circuit sets the detection reference, the host terminal controls the display device to display a plurality of input-button images respectively showing different characters on the display device and prompt a user to input a predetermined character string, to guide the indicator to come into contact with a predetermined position within the detection surface.

10. The touch panel system according to claim 9, wherein, when the indicator comes into contact with a position of the touch panel within the detection surface that corresponds to a position immediately above any one of positions of the display device where the input-button images are displayed, the host terminal changes an array of the input-button images that are displayed on the display device.

11. The touch panel system according to claim 1, further comprising
a display device for displaying an image,
wherein the touch panel is provided on a display surface of the display device where the image is displayed.

12. The touch panel system according to claim 8, wherein the display device is a liquid crystal display, a plasma display, an organic EL display or a field emission display.

13. An electronic information device comprising the touch panel system according to claim 1.

14. The touch panel system according to claim 1, wherein the touch panel includes a cover glass as a member constituting the touch panel, and the uneven distribution of the thickness is caused due one or more undulations in an upper surface of the cover glass.

* * * * *